US012660811B2

(12) United States Patent
Parker

(10) Patent No.: US 12,660,811 B2
(45) Date of Patent: Jun. 23, 2026

(54) METHOD OF ATTRACTING WATERFOWL VIA WATER SOUNDS

(71) Applicant: Blue Bird Waterfowl Inc, Santa Rosa, CA (US)

(72) Inventor: George Parker, Santa Rosa, CA (US)

(73) Assignee: Blue Bird Waterfowl Inc, Santa Rosa, CA (US)

( * ) Notice: Subject to any disclaimer, the term of this patent is extended or adjusted under 35 U.S.C. 154(b) by 0 days.

(21) Appl. No.: 18/780,461

(22) Filed: Jul. 22, 2024

(65) Prior Publication Data

US 2024/0373837 A1      Nov. 14, 2024

Related U.S. Application Data

(63) Continuation-in-part of application No. 17/695,802, filed on Mar. 15, 2022, now Pat. No. 12,041,929.

(51) Int. Cl.
*A01M 31/06*          (2006.01)
*A01M 31/00*          (2006.01)

(52) U.S. Cl.
CPC .......... *A01M 31/06* (2013.01); *A01M 31/004* (2013.01)

(58) Field of Classification Search
CPC ........................... A01M 31/06; A01M 31/004
USPC ........................................ 43/2, 3, 26.1, 26.2
See application file for complete search history.

(56) References Cited

U.S. PATENT DOCUMENTS

| | | | | | |
|---|---|---|---|---|---|
| 843,588 | A | * | 2/1907 | Ditto | A01M 31/06 43/3 |
| 2,793,456 | A | * | 5/1957 | Argo | A01M 31/06 43/3 |
| 3,736,688 | A | * | 6/1973 | Caccamo | A01M 31/06 43/3 |
| 4,375,337 | A | * | 3/1983 | Yerger | E04H 4/0006 4/491 |
| 5,105,573 | A | * | 4/1992 | Mays | A01K 85/16 43/17.1 |
| 5,551,923 | A | * | 9/1996 | Worzella | A01M 31/06 472/137 |
| 5,809,683 | A | * | 9/1998 | Solomon | A01M 31/06 43/3 |

(Continued)

FOREIGN PATENT DOCUMENTS

CA          2391478 A1 * 12/2003
DE          9404049 U1 * 10/1994

*Primary Examiner* — Darren W Ark
(74) *Attorney, Agent, or Firm* — My Patent Guys; Christopher Pilling

(57)          ABSTRACT

The present disclosure pertains to an innovative method for attracting waterfowl, specifically designed to enhance the efficacy of waterfowl hunting by replicating natural water sounds that mimic the activities of waterfowl, such as splashing, swimming, fishing, and mating. The invention utilizes a mechanical apparatus equipped with a sound-producing puck attached to a reciprocating pole, driven by a motor or by use by hand. The puck is designed to strike the water at controlled intervals, creating a variety of water sounds that effectively mimic natural waterfowl sounds, thereby attracting the birds. This method is intended for use with either standalone devices or in conjunction with existing waterfowl decoys to provide hunters with a novel and more effective way to attract waterfowl by using sounds that replicate natural waterfowl behavior.

10 Claims, 9 Drawing Sheets

(56)  References Cited

U.S. PATENT DOCUMENTS

| | | | | | |
|---|---|---|---|---|---|
| 5,930,936 | A  * | 8/1999 | Parr | A01M 31/06 | 43/3 |
| 6,079,140 | A  * | 6/2000 | Brock, IV | A01M 31/06 | 43/3 |
| 6,092,323 | A  * | 7/2000 | McBride | A01M 31/06 | 43/3 |
| 6,170,188 | B1 * | 1/2001 | Mathews | A01M 31/06 | 43/3 |
| 6,339,893 | B1 * | 1/2002 | Solomon | A01M 31/06 | 43/3 |
| 6,339,894 | B1 * | 1/2002 | Solomon | A01M 31/06 | 43/3 |
| 6,625,919 | B1 * | 9/2003 | Davis | A01M 31/06 | 43/3 |
| 6,715,228 | B1 * | 4/2004 | Price | A01M 31/06 | 43/2 |
| 7,043,865 | B1 * | 5/2006 | Crowe | A01M 31/06 | 43/3 |
| 7,472,508 | B2 * | 1/2009 | Myers, IV | A01M 31/06 | 43/26.1 |
| 7,788,838 | B2 * | 9/2010 | Anthony | A01M 31/06 | 43/2 |
| 7,937,881 | B2 * | 5/2011 | Price | A01M 31/06 | 43/3 |
| 8,347,545 | B2 * | 1/2013 | Ivie | A01M 31/06 | 43/2 |
| 8,739,457 | B1 * | 6/2014 | Key | A01M 31/06 | 43/2 |
| 8,776,427 | B1 * | 7/2014 | Lening | A01K 97/02 | 43/42.31 |
| 12,041,929 | B2 * | 7/2024 | Parker | A01M 31/06 | |
| 2002/0162268 | A1 * | 11/2002 | Fulcher | A01M 31/06 | 43/3 |
| 2002/0178639 | A1 * | 12/2002 | Daniels | A01M 31/06 | 43/3 |
| 2003/0101635 | A1 * | 6/2003 | Fencel | A01M 31/06 | 43/3 |
| 2007/0015436 | A1 * | 1/2007 | Halstead | A01M 31/004 | 446/418 |
| 2009/0241401 | A1 * | 10/2009 | Price | A01M 31/06 | 43/3 |
| 2010/0287811 | A1 * | 11/2010 | Ivie | A01M 31/06 | 43/2 |
| 2015/0181861 | A1 * | 7/2015 | Butz | A01M 31/06 | 43/2 |
| 2023/0371497 | A1 * | 11/2023 | Bradley | A01M 31/06 | |
| 2025/0113819 | A1 * | 4/2025 | Denmon | A01M 31/06 | |

* cited by examiner

101

105

104

106

101A

107

103

108B

109

203

208

209

210

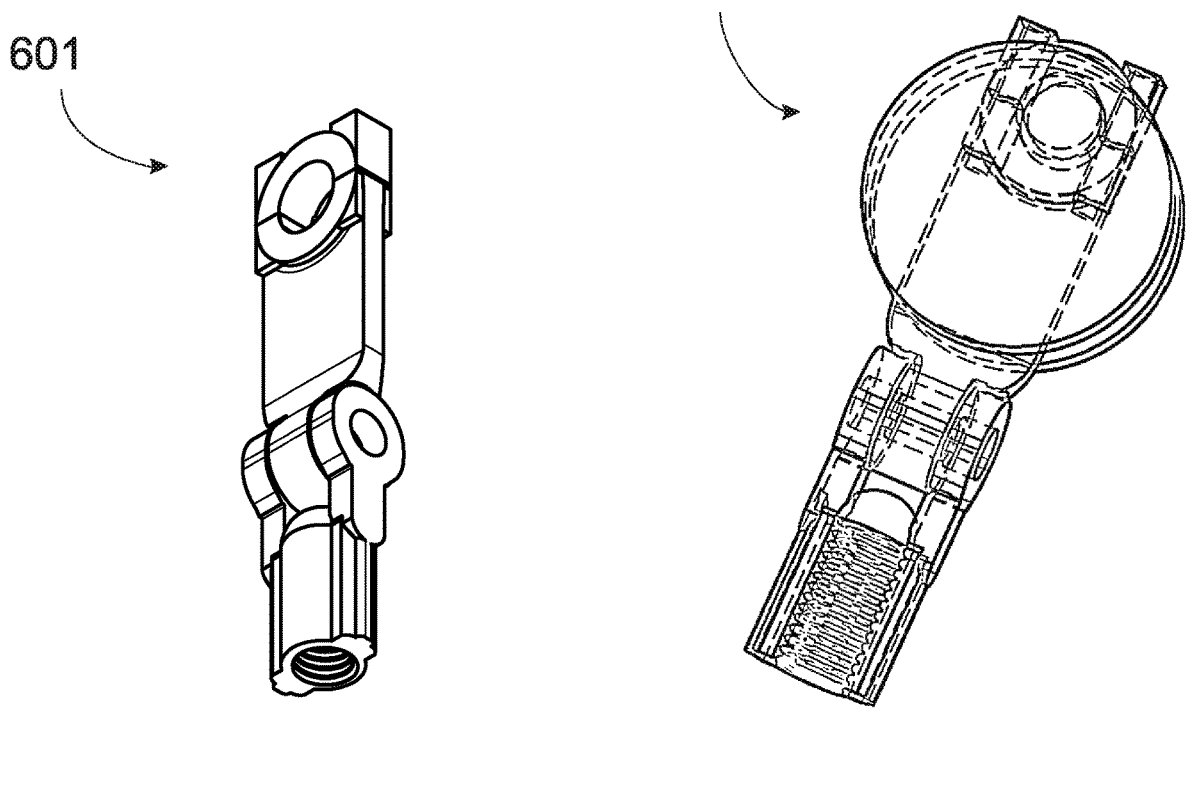
601
701
FIG. 6A                              FIG. 6B

Time

METHOD OF ATTRACTING WATERFOWL VIA WATER SOUNDS

CROSS-REFERENCE TO RELATED APPLICATIONS

The present invention is a continuation and part application to U.S. Nonprovisional application Ser. No. 17/695,802, filed Mar. 15, 2022, entitled "Ripple Apparatus for Waterfowl Decoy", which is hereby incorporated in its entirety, at least by reference.

BACKGROUND OF THE INVENTION

1. Field of the Invention

The present invention relates generally to waterfowl hunting techniques and more particularly to a method of attracting waterfowl via water sounds.

2. Description of Related Art

When hunting waterfowl species, such as ducks, hunters typically use devices known as decoys—man-made objects resembling ducks or similar waterfowl. These decoys, often placed in lakes or ponds, can be simple floating replicas or more sophisticated models with motion elements like spinning wings. While these traditional decoys visually attract waterfowl, they do not produce the natural sounds associated with waterfowl activities in the water.

In contrast, other forms of hunting utilize natural sound mimicking effectively. For instance, deer hunters may use rattling antlers to simulate the sound of clashing antlers, and turkey hunters might scrape a rake against the ground to mimic the scratching sounds of foraging turkeys. Despite these developments in other hunting fields, there has never been a natural call in the waterfowl hunting space. Yet there are many vocal call types. More specifically, waterfowl hunting primarily relies on vocal calls—such as feeding calls, quacks, hail calls, lonesome hen, and comeback calls—produced either by mouth or mechanical devices. These calls mimic vocalizations but are not natural sounds that waterfowl produce in their environment.

Consequently, there is a distinct need for a method that can generate non-vocal, natural water sounds to attract waterfowl.

BRIEF SUMMARY OF THE INVENTION

The following presents a simplified summary of some embodiments of the invention in order to provide a basic understanding of the invention. This summary is not an extensive overview of the invention. It is not intended to identify key/critical elements of the invention or to delineate the scope of the invention. Its sole purpose is to present some embodiments of the invention in a simplified form as a prelude to the more detailed description that is presented later.

It is a main object of the present invention to provide a method of creating or producing natural water sounds to attract waterfowl, wherein the natural water sounds mimic the sounds of waterfowl wings on the water including but not limited to splashing, swimming, clapping, slapping, bathing, feeding, fishing, and mating.

In order to do so, a method for attracting waterfowl is provided, comprising providing a device configured to produce water sounds, the device comprising a motor, a reciprocating pole, and a sound-producing puck; positioning the device near a body of water wherein the puck is at or near a water surface of the body of water; activating the motor to drive the reciprocating motion of the pole, wherein the motion causes the puck to strike the water surface and produce water sounds mimicking natural waterfowl activities.

In one embodiment, the water sounds mimic the sound of waterfowl activities including at least one of splashing, swimming, clapping, bathing, feeding, fishing, and mating. In one embodiment, the device is integrated with a spinning waterfowl decoy. In one embodiment, a further step of coupling the device to a spinning wing of the spinning waterfowl decoy is provided, utilizing the rotational movement of the spinning wing to facilitate the reciprocating motion of the pole. In one embodiment, the puck is adjustable along the length of the pole to vary the height at which the puck strikes the water surface. In one embodiment, the device is configured to provide an equal interval at which the puck strikes the water to create a rhythmic pattern of water sounds. In another embodiment, the device is configured as a standalone device separate from any existing waterfowl decoys or spinning waterfowl decoys. In yet another embodiment, a step of anchoring the standalone device in the body of water to maintain its position during operation is provided.

In another aspect of the invention, a method for attracting waterfowl is provided, comprising providing a device configured to produce water sounds, wherein the device includes a pole and a sound-producing puck; positioning the device adjacent to a body of water such that the puck is at or near the water surface; actuating the pole to move in a reciprocating up and down motion, wherein this motion causes the puck to intermittently contact the water surface and produce water sounds that mimic non-vocal natural waterfowl activities in the water.

In one embodiment, the device is manually powered, and the actuating step is performed by hand. In another embodiment, the actuating step is powered by a motor.

The foregoing has outlined rather broadly the more pertinent and important features of the present disclosure so that the detailed description of the invention that follows may be better understood and so that the present contribution to the art can be more fully appreciated. Additional features of the invention will be described hereinafter which form the subject of the claims of the invention. It should be appreciated by those skilled in the art that the conception and the disclosed specific methods and structures may be readily utilized as a basis for modifying or designing other structures for carrying out the same purposes of the present disclosure. It should be realized by those skilled in the art that such equivalent structures do not depart from the spirit and scope of the invention as set forth in the appended claims.

BRIEF DESCRIPTION OF THE SEVERAL VIEWS OF THE DRAWINGS

Other features and advantages of the present invention will become apparent when the following detailed description is read in conjunction with the accompanying drawings, in which:

FIG. 6A is a perspective view of a portion of an alternative decoy attachment element according to an embodiment of the present invention.

FIG. 6B is a perspective view of a portion of an alternative decoy attachment element according to an embodiment of the present invention.

DETAILED DESCRIPTION OF THE PREFERRED EMBODIMENT

The following description is provided to enable any person skilled in the art to make and use the invention and sets forth the best modes contemplated by the inventor of carrying out his invention. Various modifications, however, will remain readily apparent to those skilled in the art, since the general principles of the present invention have been defined herein to specifically provide a method of attracting waterfowl via water sounds.

It is to be understood that the terminology used herein is for the purpose of describing particular embodiments only and is not intended to be limiting. The terms "a" or "an," as used herein, are defined as to mean "at least one". The term "plurality," as used herein, is defined as two or more. The term "another," as used herein, is defined as at least a second or more. The terms "including" and/or "having," as used herein, are defined as comprising (i.e., open language). The term "coupled," as used herein, is defined as connected, although not necessarily directly, not necessarily mechanically, and not permanent. The term "providing" is defined herein in its broadest sense, e.g., bringing/coming into physical existence, making available, and/or supplying to someone or something, in whole or in multiple parts at once or over a period of time. As used herein, the terms "about", "generally", or "approximately" apply to all numeric values, whether or not explicitly indicated. These terms generally refer to a range of numbers that one of skill in the art would consider near the stated amount by about 0%, 5%, or 10%, including increments therein. In many instances these terms may include numbers that are rounded to the nearest significant figure. The term "non-vocal" refers to sounds that are neither produced by the human voice nor designed to mimic sounds originating from the vocal apparatus of waterfowl.

Figures 1A, 1B:
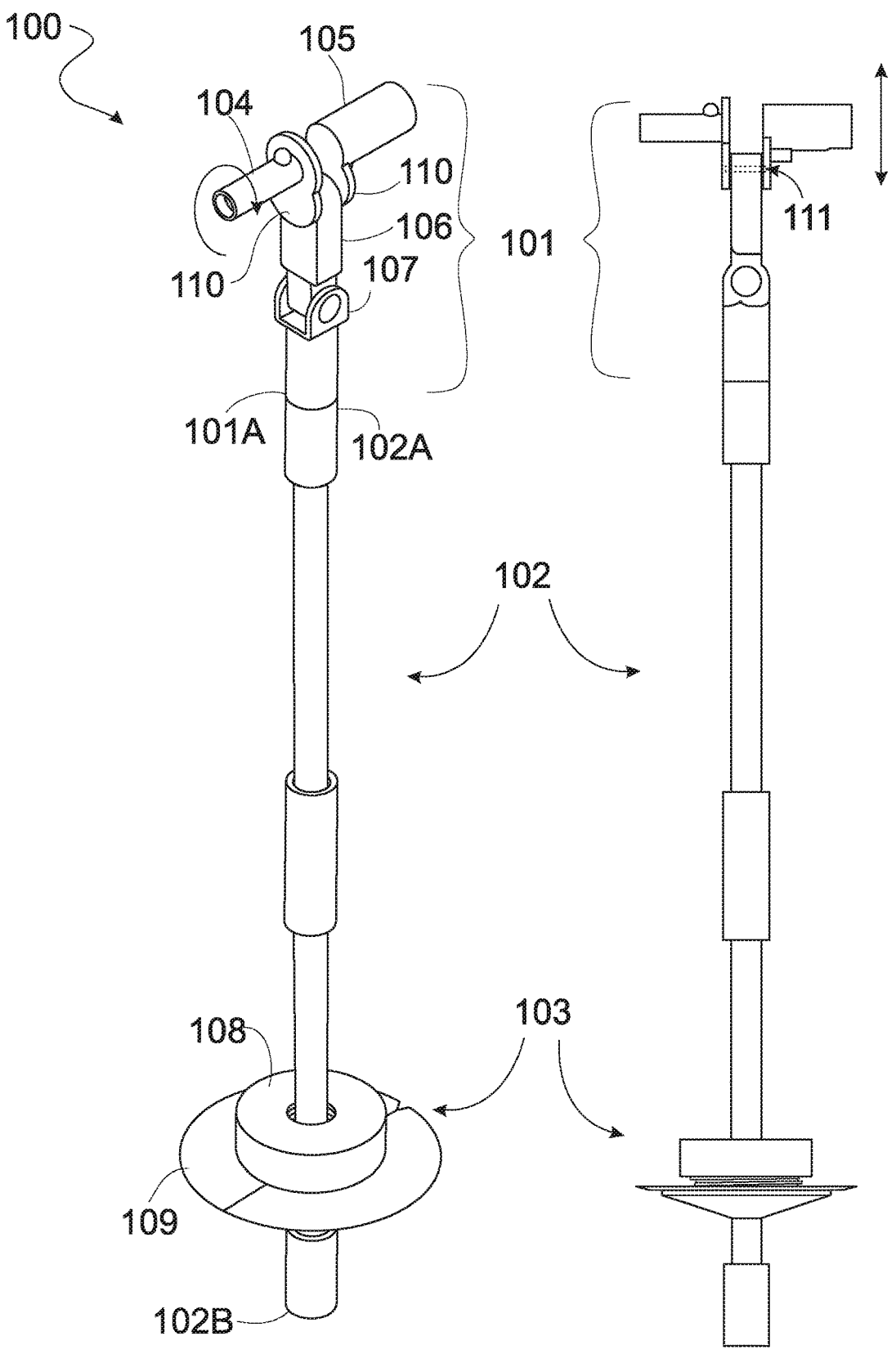
FIG. 1A a perspective view of a device configured to produce water sounds according to an embodiment of the present invention.
FIG. 1B is a front view of FIG. 1A.

FIGS. 1A-B are various views of an exemplary device for producing water sounds according to an embodiment of the present invention. Referring now to FIGS. 1A-B, one exemplary device to produce water sounds is illustrated. However, it should be understood other devices may be realized and the following is one example. In one embodiment, the device 100 comprises a decoy attachment element 101, pole 102, and puck 103. In one embodiment, the decoy attachment element includes a pair of attachment members 104 and 105, wherein one attachment member 105 is configured to be coupled to a spinning wing member of a waterfowl decoy (with the wing removed), and the other attachment member 104 is configured to be coupled to the wing such that the existing waterfowl decoy may operate as intended. Simply put, the exemplary device is utilizing the motor and spinning shaft element to provide reciprocating motion, and more particularly rotation to the device, which then converts this rotation to linear motion. It should be understood that it is advantageous to attach the device to an existing spinning wing decoy, however, the device may be a free standing device with its own motor to provide the reciprocating motion. Yet in other embodiments, the device may be operated by hand without the use of a motor.

In one embodiment, each pair of attachment members 104 and 105 includes a pivoting disk 110, wherein the pivoting disk 110 is either attached, coupled, or formed with each respective attachment member. The pivoting disk 110 is rotatably attached to a body member 106 of decoy attachment element 101 via a screw, pin or shaft (111; FIG. 1B). During use, as the waterfowl decoy wing spinning shaft rotates, this is configured to rotate the connected attachment members, spinning the pivoting disk 110, which rotates the body member 106 about the screw, pin, or shaft 111. As the body member 106 rotates it remains in a vertical position, transferring the rotational motion to linear motion. In one embodiment, the body member is hingedly coupled to a lower attachment member 101A via hinge 107 forming the bottom portion of the decoy attachment element 101. In one embodiment, the pivoting disk and body member functions as a crank such that the rotational motion of the spinning shaft is transferred or converted to linear motion at the lower attachment member 101A.

Still referring to FIGS. 1A-B, in one embodiment, the pole 102 is configured to be attached or coupled to the decoy attachment element 101 via the lower attachment member 101A. The means of attachment may be any attachment method known in the art, including but not limited to, a threaded connection, interference fit, magnetic connection, fasteners, etc. Preferably, it is an attachment method that is easy to disconnect the pole from the lower attachment member for ease of transportation, storage, and installation. In one embodiment, the pole 102 includes a top portion 102A and a bottom portion 102B, wherein the top portion 102A is configured to be removably attached to the lower attachment member 101A. In some embodiments, the bottom portion 102B is configured to be touching a ground surface (under water) when in use, in other embodiments, the bottom portion is positioned above the ground surface. In yet alternative embodiments, the bottom portion 102B of the pole 102 is comprised of one or more weights configured to provide stability to the apparatus.

To create a water sound during use, in some embodiments, a puck or disk 103 is provided. In one embodiment, the puck 103 comprises a connecting portion 108 and puck disk 109. In some embodiments, the position of the puck 103 along the pole 102 may vary and is adjustable by the user. In one embodiment, the puck 103 is positioned such that the puck disk 109 is at the height of the water line or water surface. In other embodiments, the puck 103 may be positioned above or below the water surface level as a starting position. As the apparatus is in use and the pole is moving up and down, it in turn moves the puck up and down to slap the water surface creating the water sound. Advantageously, the natural water sounds mimic the sounds of waterfowl wings on the water including but not limited to splashing, swimming, clapping, slapping, bathing, feeding, fishing, and mating. Advantageously, these sounds attract waterfowl in the area, enabling the hunter an improved technique to attract waterfowl.

Figure 2:
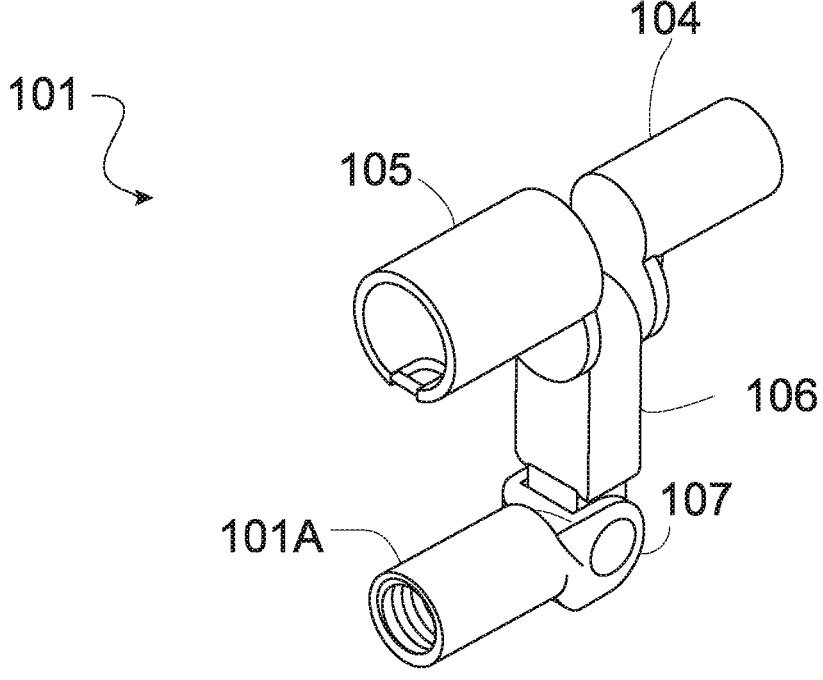
FIG. 2 is a perspective view of the decoy attachment element showing the lower attachment element rotated according to an embodiment of the present invention.

Referring now to FIG. 2, the decoy attachment element 101 is illustrated showing the lower attachment member 101A rotated via hinge 107. Female threading can be seen within the lower attachment member 101A, however, as previously described, the specific connection between the lower attachment member 101A and pole (102; FIG. 1) may vary. The pair of attachment members 104 and 105 are also illustrated with body member 106. It should be noted, that in alternative embodiments, the pole may directly attach to body member 106 and the functionality of the apparatus would be similar. In this embodiment, lateral motion of the pole during use would be provided, which could produce unique ripples, waves, and sounds from the addition of the lateral motion. However, in the illustrated embodiment, the hinge 107 helps convert the rotational motion to linear motion as previously described enabling the body member to function as a crank. Further, the hinge 107 and lower attachment member 101A enables ease of installation and removal of the pole.

Figure 3:
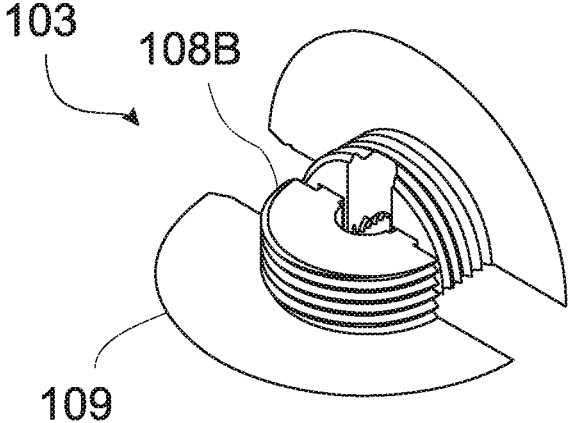
FIG. 3 is a perspective view of a water sound producing element removed from the apparatus according to an embodiment of the present invention.

FIG. 3 is a perspective view of a portion of a puck not secured to the pole of the device according to an embodiment of the present invention. As previously mentioned, in some embodiments, the puck 103 is configured to be removably positioned along the pole (102; FIG. 1). There are several ways this may be accomplished. In one embodiment, the puck 103 may be formed with two portions, wherein the two portions may be connected via connecting portion 108B.

In other embodiments, the diameter of the connecting portion may vary such that the puck is configured to be tightened in position. Likewise, a fastening element may also be used to secure the puck in position, such as tightening screw knob. Regardless of how the puck is secured to the pole, the important feature is that the position of the puck is adjustable on the pole such that the height of the puck disk 109 is adjustable and the puck may be moved to a desired position, e.g. at the water surface, above the water surface, or below the water surface.

Figure 4A:
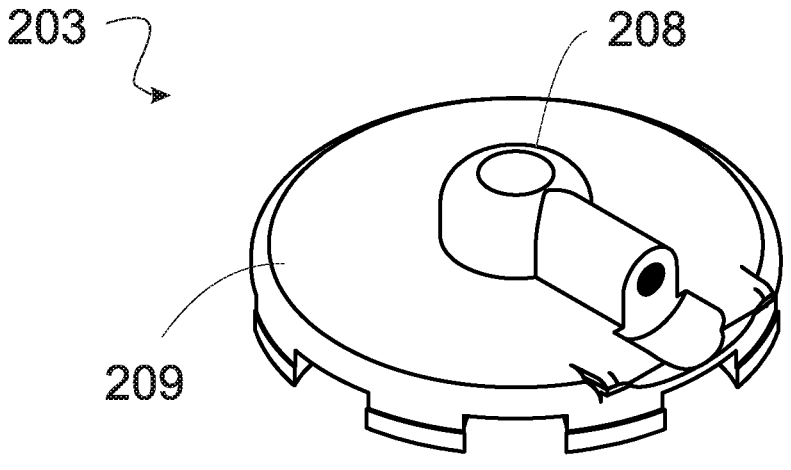
FIG. 4A is a top perspective view of a water sound producing element according to an embodiment of the present invention.
Figure 4B:
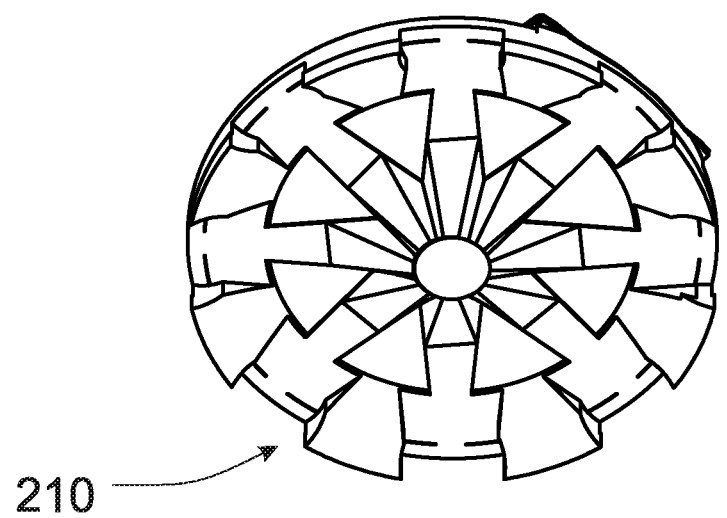
FIG. 4B is a bottom perspective view the water sound producing element of FIG. 4A.

FIGS. 4A-B show various perspective views of an alternative puck 203. Similar to the puck previously discussed, the alternative puck 203 includes a connecting member 208 and puck disk 209. In some embodiments, the puck disk 209 comprises an array of triangular shapes of varying depths 210. Advantageously, the array of triangular shapes 210 is configured to make sounds via the cavitation of the air pockets based on the voids the triangular shapes make, as well as provide water sounds as the puck hits the surface of the water during use. In one embodiment, the sound is a smacking sound as previously discussed, which is configured to imitate the natural sound made by the wings of birds or waterfowl as they exit the water, or other natural sounds of bathing, feeding, fishing, mating, etc. It should be understood, that two puck designs were provided, but others may be realized without departing from the spirit or scope of the invention. Conceptually the following characteristics are important for the puck, having a shape that creates a sound configured to imitate the natural sound made by the wings of birds or waterfowl as they exit the water as the shape hits the water, or other similar natural sounds as previously discussed. It should be understood that although a disk like shape was illustrated and described, the puck may be any shape known in the art that provides the aforementioned characteristics, including but not limited to, square, round, circular, ball, irregular, triangular, polygonal, or similar. Generally, a flat area is required, without or without air voids, having enough surface area to produce the clapping sound as the puck hits the water.

Figure 5:
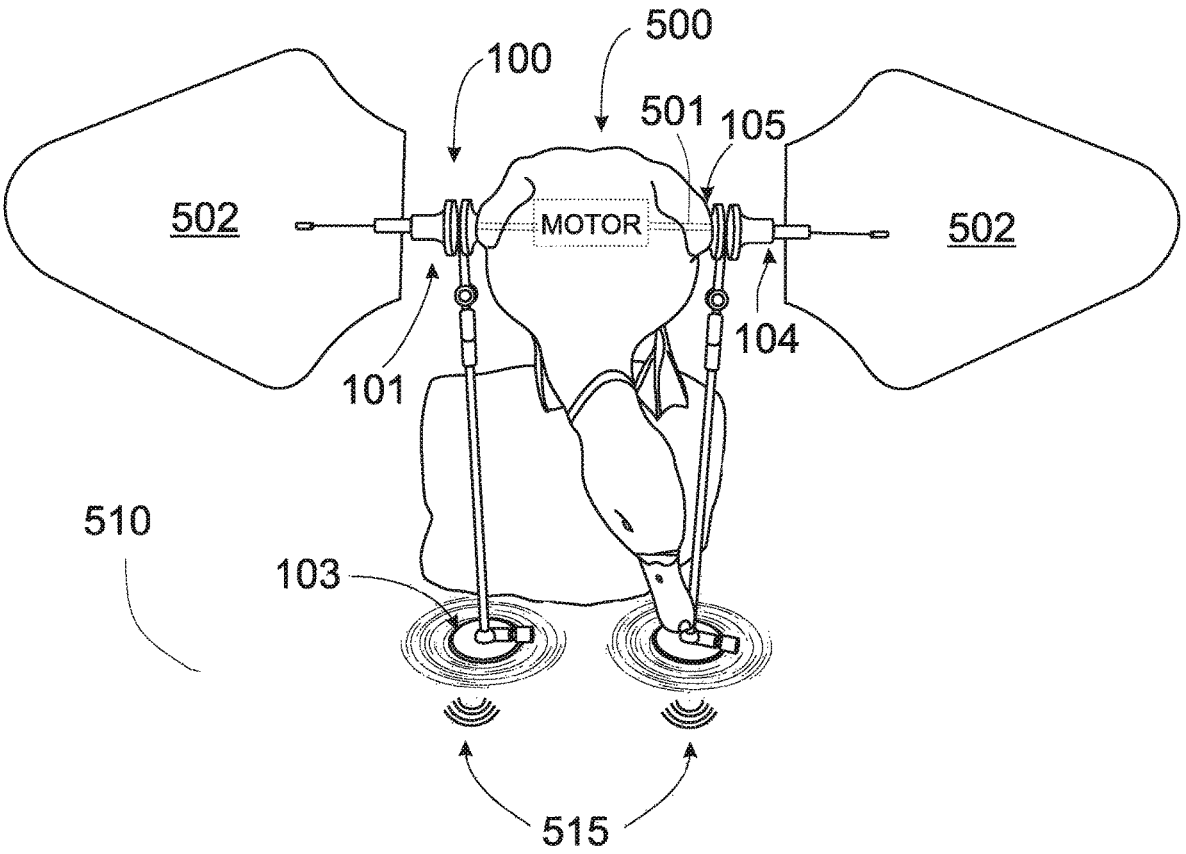
FIG. 5 is a perspective view of an exemplary device configured to produce water sounds installed on a waterfowl decoy according to an embodiment of the present invention.

Referring now to FIG. 5, one exemplary water sound producing device 100 is shown installed and coupled to an existing waterfowl decoy 500. In one embodiment, the waterfowl decoy is a stationary decoy configured to be stationary when positioned in a body of water 510. The device may be any similar device having a motor configured to spin a shaft, which the decoy attachment element 101 may attach or be coupled to, i.e. the sound producing device does not need to be attached to an existing spinning wing decoy.

During use, if the device is used with an existing spinning wing decoy, one or preferably a pair of water sound producing devices 100 are attached to the spinning shaft or shafts 501 of the decoy 500 via the decoy attachment element 101, and more particularly attachment end 105. Otherwise, if it is a free standing device without the intended use of being attached to an existing spinning wing decoy, then one sound producing device is provided, however more than one can also be used. Next, the wings are positioned on the free attachment end 104 such that the decoy is also configured to spin wings 502 as intended (if the device is used with an existing spinning wing decoy). Now, when the decoy is turned on and the motor is activated which makes the wings spin, this motion operates the device as previously described to create the natural non-vocal water sounds 515 mimicking a bird taking off from the water, landing in the water, splashing, bathing, feeding, fishing, mating, etc. Advantageously, as the wings 502 spin, the puck 103 hits the water after every full rotation of the spin, providing a consistent or equal interval of sound production, which leads to a more natural sounding water sound. An unexpected advantage of the present invention in use with an existing wing decoy is that the weight of the device forces a single side of the wing to show upwards towards the sky when the wings stop spinning. A current issue with spinning waterfowl decoys is the intermittent stopping of the wings causes the bright white side of the wing to show upwards as opposed to the color side. In these situations, the waterfowl will leave the area as the color is unnatural. The bright white side and color combination creates a strobe effect during use, however when the wings stop spinning it could leave the wings in a bad position to attract waterfowl if the bright white side is positioned toward the sky. Thus, the weight of the device attached to the wing spinning shaft 501 forces the wings to rest with the color side up to preventing this issue from occurring.

One advantage of the present invention is the apparatus may be used without the wings installed as specific hunting seasons prevent the use of spinning wing decoys. In the event the device is configured to be used with an existing spinning wing decoy, it should be understood that there are many different brands of wing spinning waterfowl decoys available, including but not limited to, decoys from Mojo®, Avian X®, and Lucky Duck®, and as a result the size, shape, and connection method of the pair of attachment members 104 and 105 will vary depending on which brand is used. For example, in some embodiments, attachment members utilize a threaded connection. In other embodiments, the attachment members utilize a clip-on attachment. Yet in other embodiments, the connection is magnetic. Several versions may be provided to the user such that the apparatus can be used with any brand wing spinning waterfowl decoy. Further the spinning waterfowl decoy may be positioned and anchored into a ground surface below the water via a stake, or float on the surface of the water.

Any materials as well known in the art may be used and selected for their specific properties. The apparatus may include a combination of materials, including but not limited to metals, plastics, wood, rubber, etc.

For the purposes of the claims, the pole may be defined as motion transfer element as its function is to transfer the linear motion of the lower attachment member to the puck. In the same spirit, the puck may be defined as a sound producing element as its function is to produce a natural water sound.

FIGS. 6A-B show two alternative embodiments of a decoy attachment element (601/701) with the pair of attachment members removed. Illustrated are the body member and lower attachment member of the decoy attachment element.

Figure 7A:
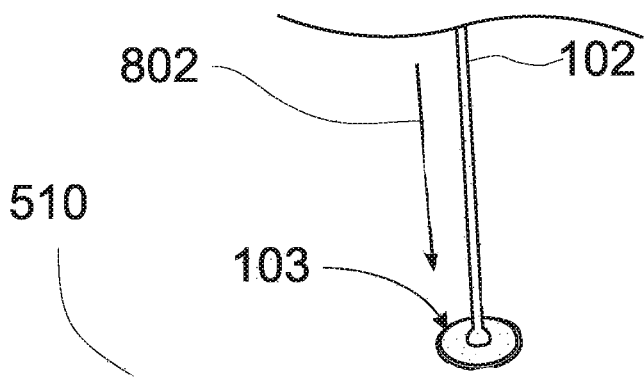
FIGS. 7A-B are diagrams illustrating a method of attracting waterfowl via water sounds according to an embodiment of the present invention.
Figure 7B:
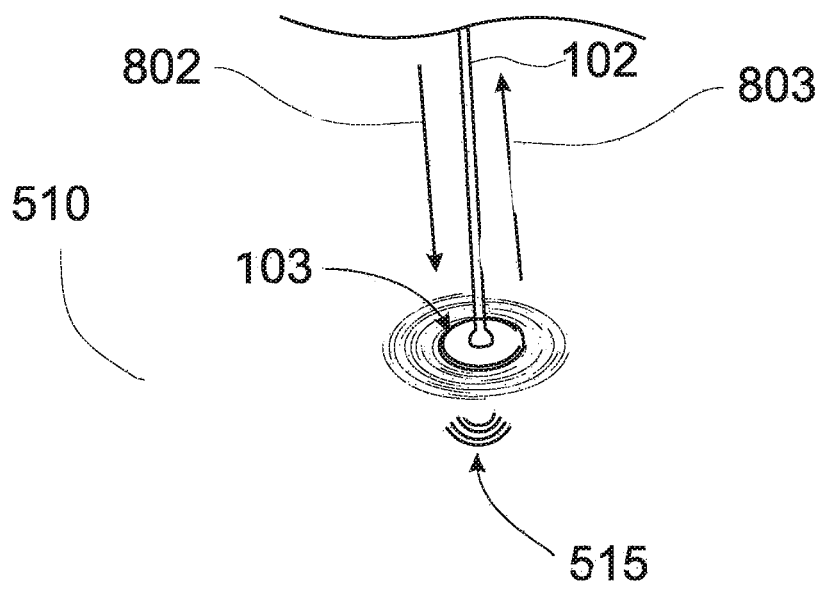

FIGS. 7A-B are diagrams illustrating a method of attracting waterfowl via water sounds according to an embodiment of the present invention. Referring now to FIGS. 7A-B, pole 102 configured for reciprocating motion, via a motor from a stand alone device or existing spinning wing decoy, is configured to move up and down (with or without lateral movement), shown via arrows 802 and 803 in FIGS. 7A and 7B respectively. Coupled to a distal end of the pole is a sound producing puck 103, generally having a bottom section with sufficient surface area to slap the surface of the water 510 during use. In some embodiments, the bottom of the puck may also feature cavities to create cavitations in the water during use, if ripples or other water movements are also desired. This reciprocating motion, i.e. up and down motion of the pole, continues at equal intervals such that when the puck strikes the surface of the water it creates a natural water sound designed to mimic the natural non-vocal sounds of waterfowl wings on the water, including but not limited to splashing, swimming, clapping, slapping, bathing, feeding, fishing, and mating.

Figure 8:
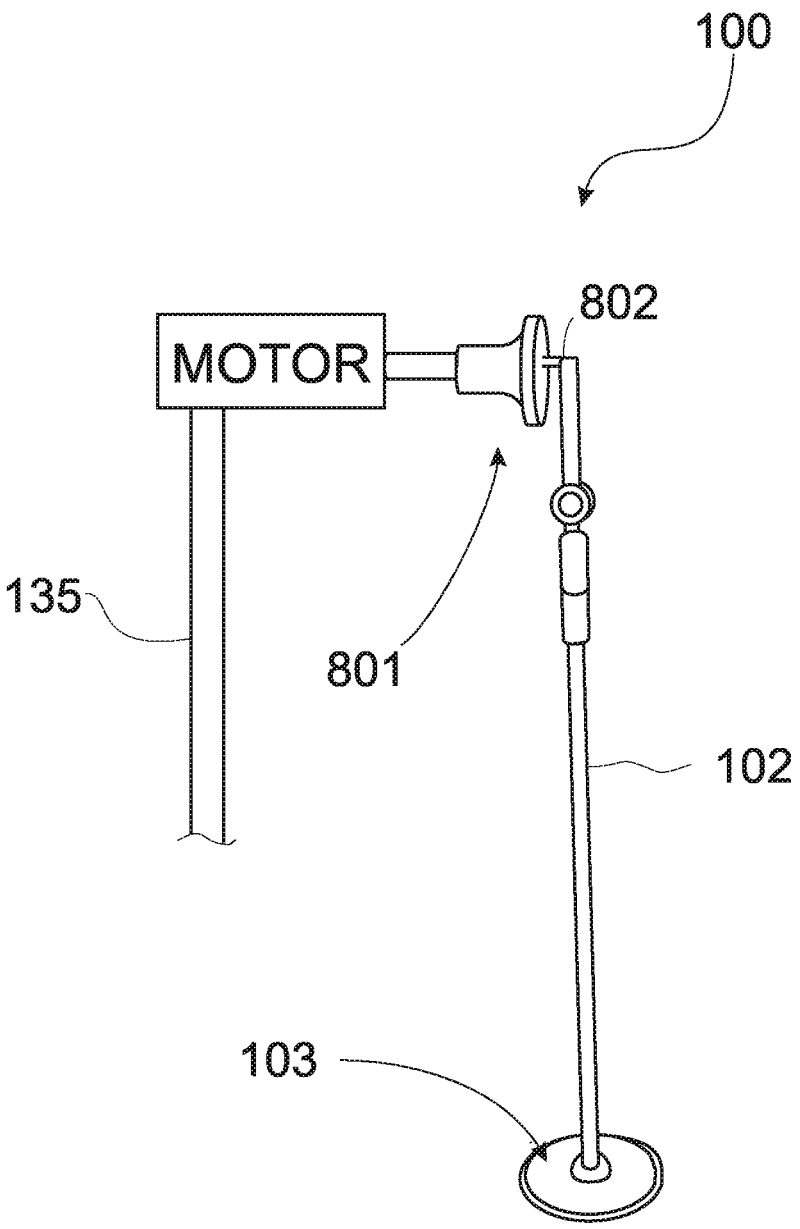
FIG. 8 is a simplified illustration of a sound producing device according to an embodiment of the present invention.

FIG. 8 is a simplified illustration of a sound producing device according to an embodiment of the present invention. Referring now to FIG. 8, the sound producing device 100 is illustrated showing only the required parts to carry out the method of the present invention. In the exemplary embodiment, the device 100 comprises a reciprocating pole 102 with a puck 103 coupled on the distal end of the pole. A motor is provided which is configured to spin a cam mechanism 801 transferring the rotational motion of the motor to the linear motion to reciprocate the pole. In alternative embodiments, a linear motor may be provided. Also provided, is a stand 135 or securement element configured to be positioned such that the device is supported for operation. One or more stands may be provided which can float or be secured to a ground surface under the water.

Figure 9A:
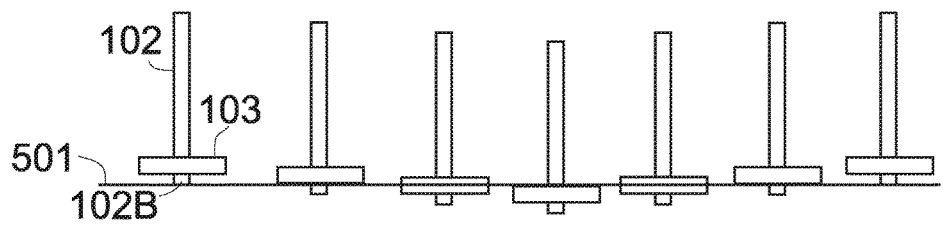
FIGS. 9A and 9B are graphical representations of the method of attracting waterfowl via water sounds according to an embodiment of the present invention.
Figure 9B:
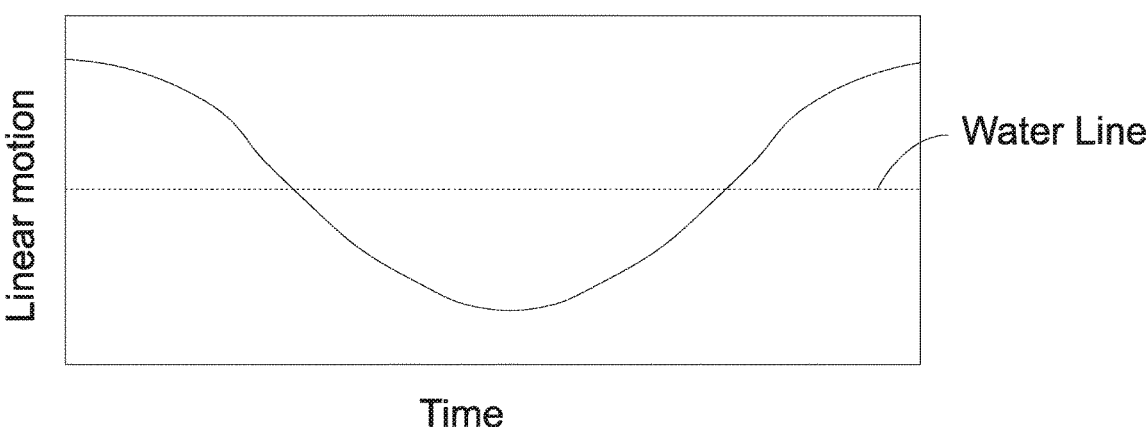

FIGS. 9A and 9B are graphical representations of the method of attracting waterfowl via water sounds. FIG. 9A shows an exemplary instance of the puck's 103 relation to the water line (water surface) 501 during use for one interval. It should be understood that one interval is generally a fraction of a second, such that multiple intervals are happening per second of operation. As previously described, the puck 103 is coupled to a pole 102 that is configured to reciprocate via a motor. In some embodiments, the pole 102 comprises a bottom portion 102B that generally includes weights to stabilize the assembly, which also helps to create the sound as it provides more force to the puck as it strikes the water's surface. It should be understood that this is just an example, and the specific height above or below the water line may vary. FIG. 9B shows another graphical representation indicating the equal intervals and impact points over time to produce the water sounds as previously described. Advantageously, the present invention provides a method to create the first known "water call" to attract waterfowl during hunting.

Figure 10:
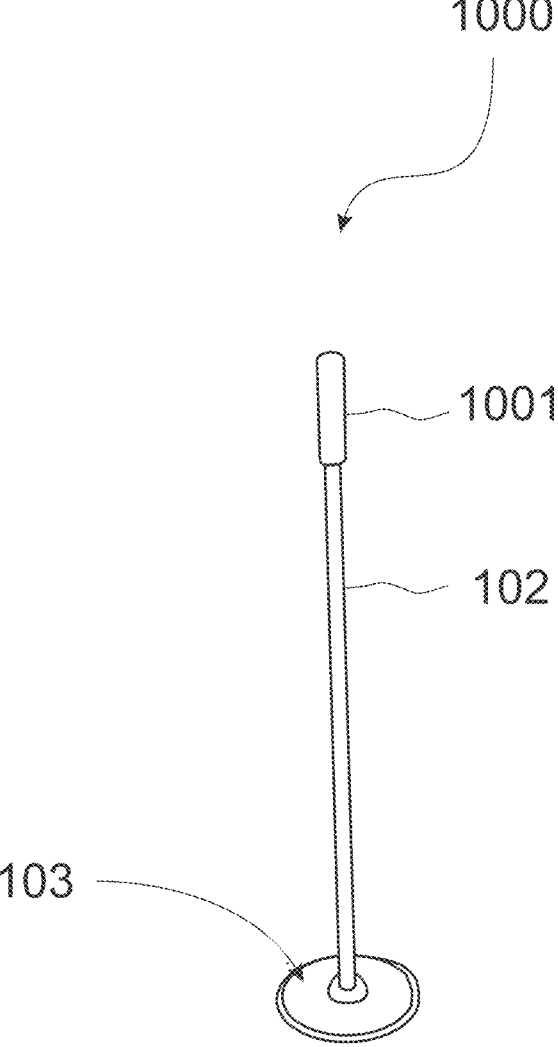
FIG. 10 is an alternative manual sound producing device according to an embodiment of the present invention

FIG. 10 is an alternative manual sound producing device according to an embodiment of the present invention. Referring now to FIG. 10, the manual sound producing device 1000 comprises a pole 102, a puck 103, and a handle 1001. This device is configured to be used by hand without the use of a motor. During use, the user would grasp the pole, or handle of the pole and physically move the device up and down such that the puck strike's the water's surface similarly as previously discussed with the motor version. This is the most simplified version of the device to produce a non-vocal natural water call for attracting waterfowl.

Although the invention has been described in considerable detail in language specific to structural features, it is to be understood that the invention defined in the appended claims is not necessarily limited to the specific features described. Rather, the specific features are disclosed as exemplary preferred forms of implementing the claimed invention. Stated otherwise, it is to be understood that the phraseology and terminology employed herein, as well as the abstract, are for the purpose of description and should not be regarded as limiting. Therefore, while exemplary illustrative embodiments of the invention have been described, numerous variations and alternative embodiments will occur to those skilled in the art. Such variations and alternate embodiments are contemplated, and can be made without departing from the spirit and scope of the invention.

For example, although a rigid pole is provided, the pole may be replaced with a string or flexible object. Further, the apparatus may be combined and built-in to its own waterfowl decoy where the decoy attachment element is fixed or part of the waterfowl decoy. Similarly, the apparatus may also be powered by a different motor, such as a stand-alone motor to provide the rotation to the apparatus. Also, the motor can pull or provide a direct linear force (as opposed to the rotational force discussed) to move the puck. As described herein, the pucks are configured for general water sounds that are configured to mimic a variety of natural waterfowl sounds in water. However, some may appreciate that in some embodiments, the device includes a variety of interchangeable pucks, each designed to produce a different sound mimicking different waterfowl activities.

It should further be noted that throughout the entire disclosure, the labels such as left, right, front, back, top, bottom, forward, reverse, clockwise, counter clockwise, up, down, or other similar terms such as upper, lower, aft, fore, vertical, horizontal, oblique, proximal, distal, parallel, perpendicular, transverse, longitudinal, etc. have been used for convenience purposes only and are not intended to imply any particular fixed direction or orientation. Instead, they are used to reflect relative locations and/or directions/orientations between various portions of an object.

In addition, reference to "first," "second," "third," and etc. members throughout the disclosure (and in particular, claims) are not used to show a serial or numerical limitation but instead are used to distinguish or identify the various members of the group.

What is claimed is:

1. A method for attracting waterfowl, comprising:

providing a device configured to produce water sounds, wherein the device includes a reciprocating pole and a sound-producing puck operatively connected to the pole;

positioning the device adjacent to a body of water such that the puck is at or near a water surface of the body of water;

actuating the pole to move the pole in a reciprocating up and down motion, wherein this motion causes the puck to intermittently contact the water surface and produce water sounds that mimic non-vocal natural waterfowl activities in the water; and wherein the puck is adjustable along a length of the reciprocating pole to vary a height at which the puck strikes the water surface.

2. The method of claim 1, wherein the device is manually powered, and the actuating step is performed by hand.

3. The method of claim 1, wherein the actuating step is powered by a motor which is operatively connected to the reciprocating pole.

4. A method for attracting waterfowl, comprising:

providing a device configured to produce water sounds, the device comprising a motor, a reciprocating pole operatively connected to the motor, and a sound-producing puck operatively connected to the reciprocating pole;

positioning the device near a body of water wherein the puck is at or near a water surface of the body of water;

activating the motor to drive the reciprocating pole to move in a reciprocating linear motion, wherein the motion causes the puck to strike the water surface and produce water sounds mimicking natural non-vocal waterfowl activities; and wherein the puck is adjustable along a length of the reciprocating pole to vary a height at which the puck strikes the water surface.

5. The method of claim 4, wherein the water sounds mimic a sound of waterfowl activities including at least one of splashing, swimming, clapping, bathing, feeding, fishing, and mating.

6. The method of claim 4, wherein the device is integrated with a spinning waterfowl decoy.

7. The method of claim 6, further comprising: coupling the device to a spinning wing of the spinning waterfowl decoy, utilizing a rotational movement of the spinning wing to facilitate the reciprocating linear motion of the pole.

8. The method of claim 4, further comprising providing an equal interval at which the puck strikes the water surface to create a rhythmic pattern of the water sounds.

9. The method of claim 4, wherein the device is configured as a standalone device separate from any existing waterfowl decoys or spinning waterfowl decoys.

10. The method of claim 9, further comprising anchoring the standalone device in the body of water to maintain its position during operation.

\* \* \* \* \*